United States Patent
Nikolai et al.

(10) Patent No.: US 11,153,216 B2
(45) Date of Patent: *Oct. 19, 2021

(54) STREAMING NETWORK

(71) Applicant: International Business Machines Corporation, Armonk, NY (US)

(72) Inventors: Jason A. Nikolai, Rochester, MN (US); Andrew Thorstensen, Morrisville, NC (US); David M. Koster, Reston, VA (US); Aditi Rajagopal, Olmsted, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/654,578

(22) Filed: Oct. 16, 2019

(65) Prior Publication Data

US 2020/0053011 A1 Feb. 13, 2020

Related U.S. Application Data

(63) Continuation of application No. 15/853,036, filed on Dec. 22, 2017, now Pat. No. 10,554,562.

(51) Int. Cl.
*H04L 12/853* (2013.01)
*H04L 12/26* (2006.01)
*H04L 12/861* (2013.01)

(52) U.S. Cl.
CPC ...... *H04L 47/2416* (2013.01); *H04L 43/0894* (2013.01); *H04L 43/10* (2013.01); *H04L 49/90* (2013.01)

(58) Field of Classification Search
CPC . H04L 47/2416; H04L 43/0894; H04L 43/10; H04L 49/90; H04L 47/286
See application file for complete search history.

(56) References Cited

U.S. PATENT DOCUMENTS

| | | | | |
|---|---|---|---|---|
| 7,808,960 | B1* | 10/2010 | Chan | H04W 40/04 370/338 |
| 10,554,562 | B2* | 2/2020 | Nikolai | H04L 47/2416 |
| 2005/0180416 | A1 | 8/2005 | Jayawardena | |
| 2008/0144633 | A1* | 6/2008 | Woloszynski | H04L 1/1867 370/395.31 |
| 2015/0244623 | A1* | 8/2015 | Heydon | H04W 4/80 370/235 |

(Continued)

OTHER PUBLICATIONS

Chen et al., "Performance analysis of geogrpyhy-limited broadcasting in multihop wireless networks," Sep. 22, 2011, John Wiley & Sons, Ltd.*

(Continued)

*Primary Examiner* — Jae Y Lee
(74) *Attorney, Agent, or Firm* — Fabian VanCott; Steven L. Nichols

(57) ABSTRACT

A computer-implemented method, in an example, may include calculating a time-to-live value for at least one packet based on a hop count between each of a plurality of processing element containers within an application streaming network; updating at least one processing element container output connection based on the calculated time-to-live value; and monitoring a streams resource metrics service for a change in a packet delivery rate.

18 Claims, 3 Drawing Sheets

(56) References Cited

U.S. PATENT DOCUMENTS

| | | |
|---|---|---|
| 2016/0112500 A1 | 4/2016 | Kim |
| 2016/0359872 A1 | 12/2016 | Yadav |
| 2016/0381069 A1 | 12/2016 | Chesla |
| 2017/0308457 A1* | 10/2017 | Barsness ................. G06F 8/436 |

OTHER PUBLICATIONS

Burke, "Definition Time-to-live (TTL)", TechTarget, 2015, 6 pages.

Chouhan et al, "Packet monitoring approach to prevent DDoS attack in cloud computing", International Journal of Computer Science and Electrical Engineering (IJCSEE), ISSN 2315-4209, 2012, vol. 1, Issue 1, 5 pages.

Lin et al., "Software-defined networking (SON) for cloud applications", Cloud Computing, 2014, Springer International Publishing, pp. 209-233.

Talpade et al., "NOMAD: Traffic-based network monitoring framework for anomaly detection", Computers and Communications, 1999, IEEE, 10 pages.

Wu et al., "Node service ability aware packet for11varding mechanism in intermittently connected wireless networks", IEEE Transactions on Wireless Communications, Dec. 2016, vol. 15, No. 12, pp. 8169-8181.

List of IBM Patents or Applications Treated as Related; Oct. 16, 2019.

\* cited by examiner

STREAMING NETWORK

BACKGROUND

Stream computing may allow various processing elements of an application to be executed in parallel using a networks resources. In this example and others, the application may be broken into its smaller processing elements and placed in containers called processing element containers distributed out to a plurality of physical computing devices within the stream computing network.

SUMMARY

According to one embodiment of the present invention a computer-implemented method may comprise calculating a time-to-live value for at least one packet based, at least, on a hop count between each of a plurality of processing element containers within an application streaming network. In an embodiment, the method may further include updating at least one processing element container output connection based on the calculated time-to-live value. In an embodiment, the method may further include monitoring a streams resource metrics service for a change in a tuple or packet delivery rate.

BRIEF DESCRIPTION OF THE SEVERAL VIEWS OF THE DRAWINGS

The accompanying drawings illustrate various examples of the principles described herein and are a part of the specification. The illustrated examples do not limit the scope of the claims.

Throughout the drawings, identical reference numbers designate similar, but not necessarily identical, elements.

DETAILED DESCRIPTION

Figure 1:
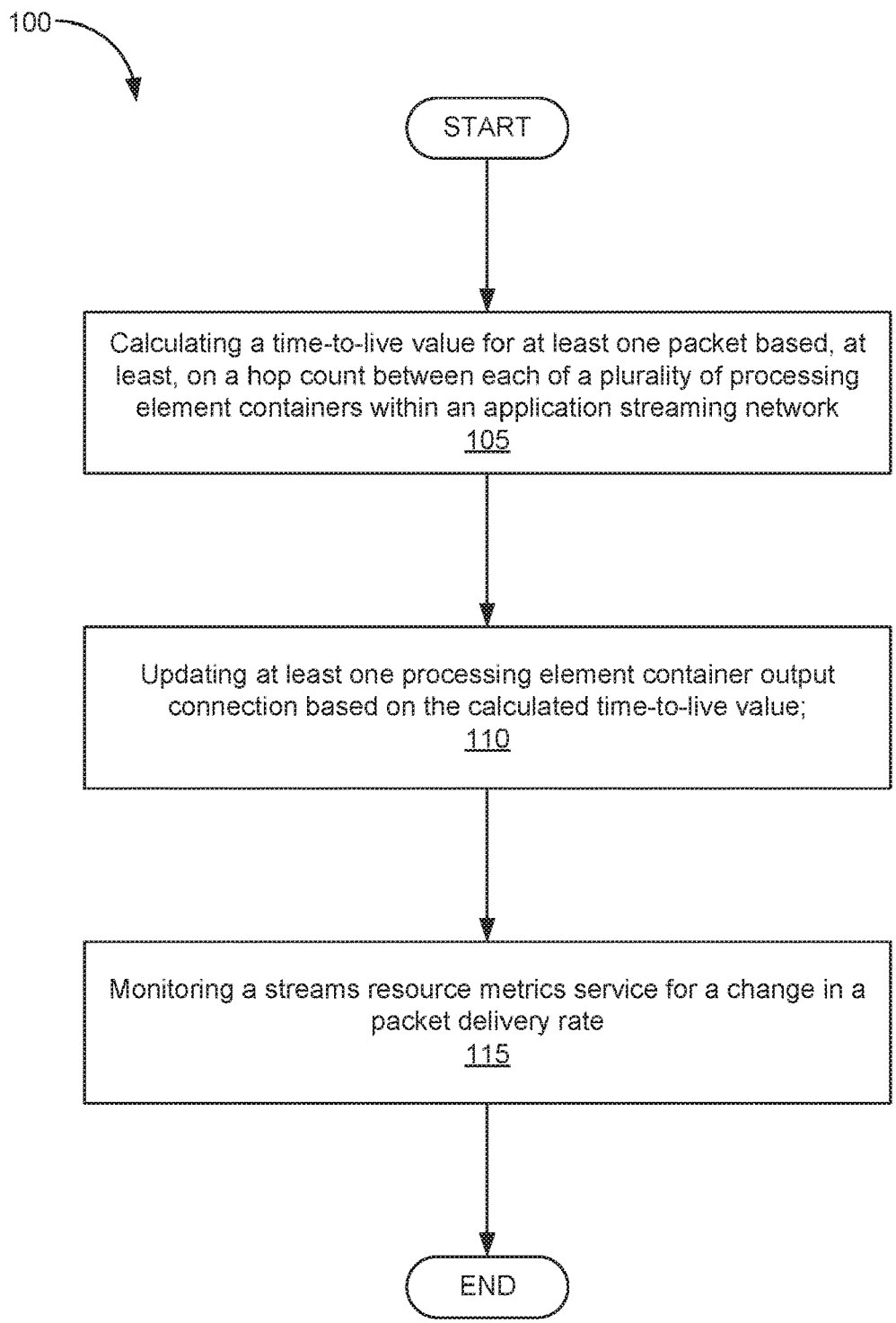
FIG. 1 is a flowchart showing a computer-implemented method according to one example of principles described herein.

In stream computing within distributed systems, an application may be separated into smaller units of computer readable and executable program code that is distributed out to a plurality of computing devices. These smaller units may be referred to as operators herein. The operators may run in process containers called processing element (PE) containers. A processing element container may include at least one of the operators that include the computer readable and executable program code to perform some type of function and/or process on data received by the processing element. These functions and/or processes may include, among others, filtering of data, aggregation of data, and enrichment of data. The operators may emit tuples made up of attributes with data types. The tuples may be either received or created by the operators, processed, and sent to other operators or, eventually to data sinks.

The operators, as described herein, may be small blocks of computer readable program code that process data when it is received. The sending of this data, in the form of tuples in a packet, allows the stream computing network to conduct parallel processing. Additionally, as the data is sent from one operator to the next, the data may be processed by a subsequent operator. During set-up and operation, an operator of the stream computing network may receive a streams application bundle (SAB). The SAB contains all of the operators to be distributed among the nodes on a stream computing network. At runtime, a scheduler may decide which of the PE containers the operators are placed in and which of the physical computing devices are used for the execution of the SAB. At this point, there is a running application consisting of a plurality of PEs across a plurality of systems made up of a plurality of operators.

The SAB, however, may include some nefarious and/or otherwise rogue operators that may create negative externalities among the network. The present specification describes a method and system used to limit the ability of the nefarious and/or rogue operators to engage in a distributed denial-of-service attack or any other type of attack that prevents any activity by the SAB outside of a defined billing region or beyond a defined resource allocation within the network.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language indicates that a particular feature, structure, or characteristic described in connection with that example is included as described, but may not be included in other examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

In the present specification and in the appended claims, the term "processing element (PE)" is meant to be understood as a process containing at least one operator.

In the present specification and in the appended claims, the term "processing element (PE)" is meant to be understood as a functional piece of computer readable program code that acts on data, usually written by developers deploying applications that is placed in a PE.

In the present specification and in the appended claims, the term "tuple" is meant to be understood as a sequence of attributes, and an attribute is a named value.

In the present specification and in the appended claims, the term "stream application bundle (SAB)" is meant to be understood as a compressed file containing a stream computing application and components to run the application.

Even still further, as used in the present specification and in the appended claims, the term "a number of" or similar language is meant to be understood broadly as any positive number comprising 1 to infinity; zero not being a number, but the absence of a number.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

FIG. 1 is a flowchart showing a computer-implemented method (100) according to one example of principles described herein. The method (100) may begin with calculating (105) a time-to-live value for at least one packet based, at least, on a hop count between each of a plurality of processing element containers within an application streaming application. In an example, the calculation (105) may be accomplished using a processing device of a computing device. Because the SAB may be deployed onto a stream computing network, the various nodes or PE containers may be used to receive, process, and/or sink data per the computer readable and executable code defined therein. The packets received and sent from each of the PE containers is may be in the form of tuples describing various data that has or is to be analyzed, processed, aggregated, and enriched, or otherwise subject to other types of processes.

During discovery of the network, a pinging process may be implemented in order to discover the layout of the SAB as well as a baseline time-to-live for each PE container by discovering the hops between any of the individual PE containers from a data source to a data sink. The time-to-live value to be used to restrain operations of the SAB on the network may be calculated using any calculation that limits the packets to physical devices used by the SAB. In an example, the time-to-live value is calculated using the following equation:

$$TTL = NumHops + ceiling(max(3, 0.1 * NumHops)) \quad \text{Eq. 1}$$

where TTL is the time-to-live, "ceiling (max" is the maximum additional threshold of hops a packet may make, and "NumHops" is the discovered number of hops between any of the operators on the stream computing network. In the example above, integers "3" and "0.1" may be varied based on a number of factors including the connectivity of the network configuration. The hop count between each of the plurality of processing element containers within the streaming network may be used to help determine a baseline number of hops that may be augmented to allow for a number of different paths any given packet (tuple) may take from one processing element container to another.

The method (100) may further include updating (110) at least one processing element container output connection based on the calculated time-to-live value. This updating process may prevent packets passing from one PE container to another from, for example, scanning portions of the stream computing network not allocated to the SAB for operation or engaging in any type of multi-casting process due to the characteristics of the computer readable and executable code.

The method (100) may further include monitoring (115) a streams resource metrics service for a change in a packet delivery rate. In an example, delivery of the packets may be accomplished as described herein and may be routed to its next PE container. However, the integers in equation 1 described herein may have been poorly chosen thereby allowing the packets to reach beyond the resources delegated for the SAB or disallowing the packets from reaching an intended PE container. Additionally, the topography of the stream computing network may have changed resulting in the integers no longer being the optimal choices. When the packets do not reach their intended destination, data defined in the packets may be lost resulting in the processing being reinitiated at the source PE container.

In order to overcome any potential missed packet delivery due to a change in the delivery rate of the packets, the method (100) may further include, in response to a decrease in the packet delivery rate, changing the calculated time-to-live value until the tuple delivery rate does not, for example, decrease. In an example, this change may be to the integers used in connection with equation 1 described herein. In an example, at least one of these integers is increased exponentially. This monitoring (115) process may also include performing, for example, a linear decrease in the increased time-to-live value until a minimum value is established and the packet delivery rate is steady. Using these processes, data may not be lost while the time-to-live for any given packet is limited to a number of hops provided within the portion of the stream computing network reserved for use of the SAB. During the monitoring (115) process, any lost packets may be replayed so that the data may be received at its intended destination within the network. The changing of the of the time-to-live value may be repeated until the data is reliably flowing between operators.

Figure 2:
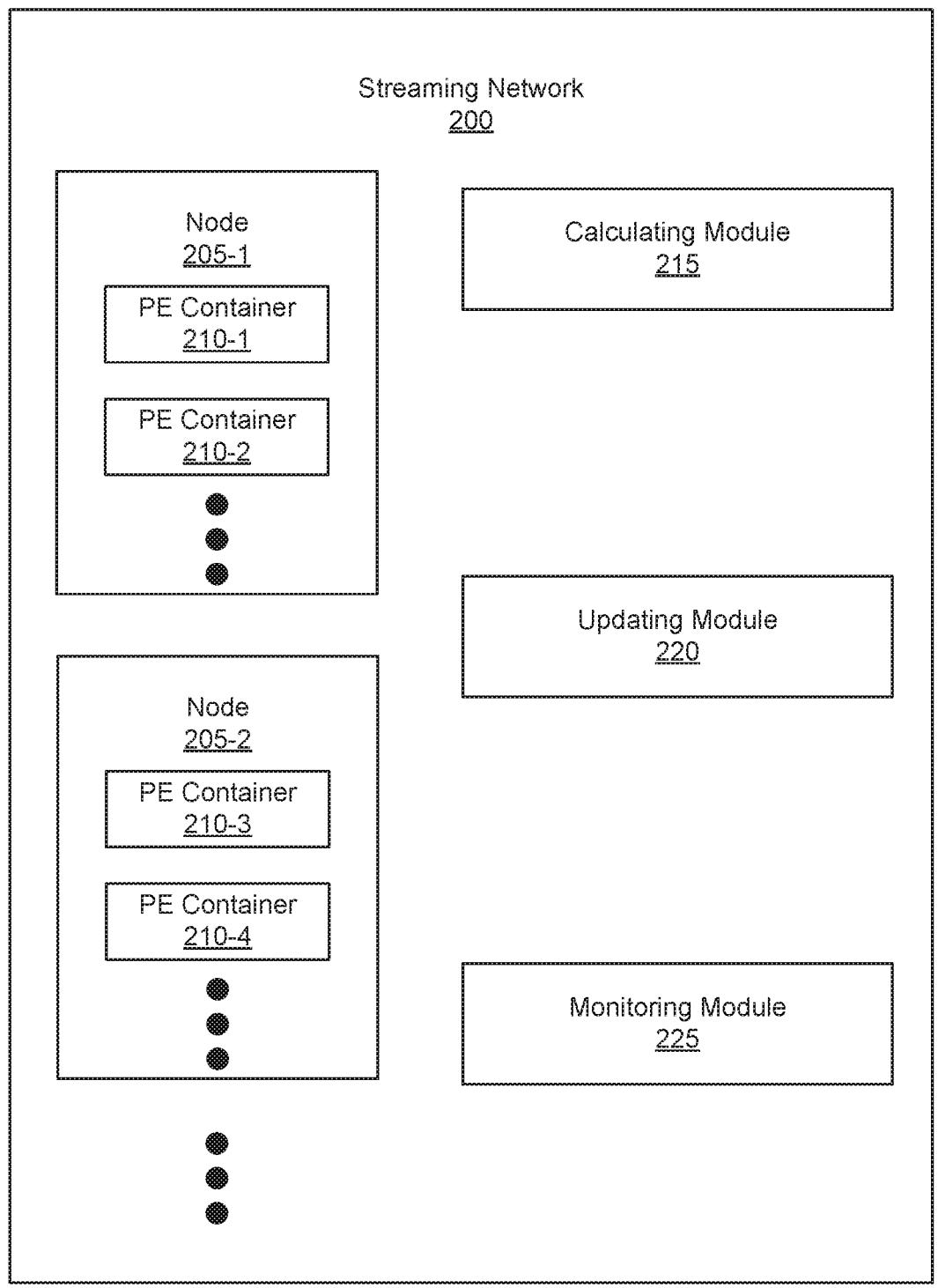
FIG. 2 is a block diagram of a streaming network according to an example of the principles described herein.

FIG. 2 is a block diagram of a streaming network (200) according to an example of the principles described herein. The streaming network (200) may include a plurality of nodes (205-1, 205-2) with each having at least one PE container (210-1-210-4), a calculating module (215), an updating module (220), and a monitoring module (225).

The plurality of nodes (205-1, 205-2) may help to define the topography of the streaming network (200) as described herein. In an example, the calculating module (215) may calculate a time-to-live value for at least one packet based, at least, on a hop count between each of the plurality of processing element containers of the nodes (205-1, 205-2). As described herein, the calculating module (215) may implement a pinging process may be implemented in order to discover the layout of the SAB as well as a baseline time-to-live for each PE container by discovering the hops between any of the individual PE containers from a data source to a data sink. The time-to-live value to be used to restrain operations of the SAB on the network may be calculated using any calculation that limits the packets to physical devices used by the SAB. In an example, the time-to-live value is calculated using equation 1 described herein.

The updating module (220) may also update at least one processing element container output connection based on the calculated time-to-live value. Again, the updating process may prevent packets passing from one PE container to another from, for example, scanning portions of the stream computing network not allocated to the SAB for operation or engaging in any type of multi-casting process due to the characteristics of the computer readable and executable code. This is done all while allowing the packets to be delivered to their destination PE containers.

The monitoring module (225) monitors a streams resource metrics service for a change in a packet delivery rate. Per equation 1, packet delivery may not be accomplished if the variables are changed or if the topography of the streaming network (200) is changed. In response to a decrease in the packet delivery rate, the monitoring module (225) may change the calculated time-to-live value until the packet delivery rate does not decrease. Additionally, the monitoring module (225) may further perform a linear decrease in the changed time-to-live value until a minimum value is established and the packet delivery rate is steady and the packets are delivered.

The streaming network (200) may include any type and number of computing devices executing computer readable and executable program code via a processor. The streaming network (200) may be utilized in any data processing scenario including, stand-alone hardware, mobile applications, through a computing network, or combinations thereof. Further, the streaming network (200) may be used in a computing network, a public cloud network, a private cloud network, a hybrid cloud network, other forms of networks, or combinations thereof. In one example, the methods provided by the streaming network (200) are provided as a service over a network by, for example, a third party. In this example, the service may comprise, for example, the following: a Software as a Service (SaaS) hosting a number of applications; a Platform as a Service (PaaS) hosting a computing platform comprising, for example, operating systems, hardware, and storage, among others; an Infrastructure as a Service (IaaS) hosting equipment such as, for example, servers, storage components, network, and components, among others; application program interface (API) as a service (APIaaS), other forms of network services, or combinations thereof. The present systems may be implemented on one or multiple hardware platforms, in which the modules 215, 220, 225) in the streaming network (200) can be executed on one or across multiple platforms. Such modules (215, 220, 225) can run on various forms of cloud technologies and hybrid cloud technologies or offered as a SaaS (Software as a service) that can be implemented on or off the cloud. In another example, the methods provided by the streaming network (200) are executed by a local administrator.

To achieve its desired functionality, the nodes (205-1, 205-2) of the streaming network (200) may include various hardware components. Among these hardware components may be a number of processors, a number of computer readable storage medium, a number of peripheral device adapters, and a number of network adapters. These hardware components may be interconnected through the use of a number of busses and/or network connections. In one example, the processors, computer readable storage medium, peripheral device adapters, and a network adapter may be communicatively coupled via a bus.

The processor may include the hardware architecture to retrieve executable code from the computer readable storage medium and execute the executable code. The executable code may, when executed by the processor, cause the processor to implement at least the functionality of methods described herein. In the course of executing computer readable and executable code, the processor may receive input from and provide output to a number of the remaining hardware units.

The computer readable storage medium may store data such as executable program code that is executed by the processor or other processing device. The computer readable storage medium may specifically store computer code representing a number of applications and/or PEs that the processor executes to implement at least the functionality described herein.

The computer readable storage medium may include various types of memory modules, including volatile and nonvolatile memory. For example, the computer readable storage medium of the present example includes Random Access Memory (RAM), Read Only Memory (ROM), and Hard Disk Drive (HDD) memory. Many other types of computer readable storage medium may also be utilized, and the present specification contemplates the use of many varying type(s) of memory in the computer readable storage medium as may suit a particular application of the principles described herein. In certain examples, different types of computer readable storage medium may be used for different data storage needs. For example, in certain examples the processor may boot from Read Only Memory (ROM), maintain nonvolatile storage in the Hard Disk Drive (HDD) memory, and execute program code stored in Random Access Memory (RAM).

The hardware adapters in the nodes (205-1, 205-2) of the streaming network (200) enable the processor to interface with various other hardware elements, external and internal to each of the nodes (205-1, 205-2). For example, the peripheral device adapters may provide an interface to input/output devices, such as, for example, display device, a mouse, or a keyboard. The peripheral device adapters may also provide access to other external devices such as an external storage device, a number of network devices such as, for example, servers, switches, and routers, client devices, other types of computing devices, and combinations thereof.

The various modules (215, 220, 225) within the streaming network (200) comprise executable program code that may be executed separately. In this example, the various modules may be stored as separate computer program products. In another example, the various modules within the streaming network (200) may be combined within a number of computer program products; each computer program product comprising a number of the modules.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises at least one executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Examples of a computer program product in the present invention may include a computer readable storage medium having program instructions embodied therewith, the program instructions executable by a processor to cause the processor to calculate a time-to-live value for at least one packet based, at least, on a hop count between each of a plurality of processing element containers within an application streaming network; update at least one processing element container output connection based on the calculated time-to-live value; and monitor a streams resource metrics service for a change in a packet delivery rate.

Figure 3:
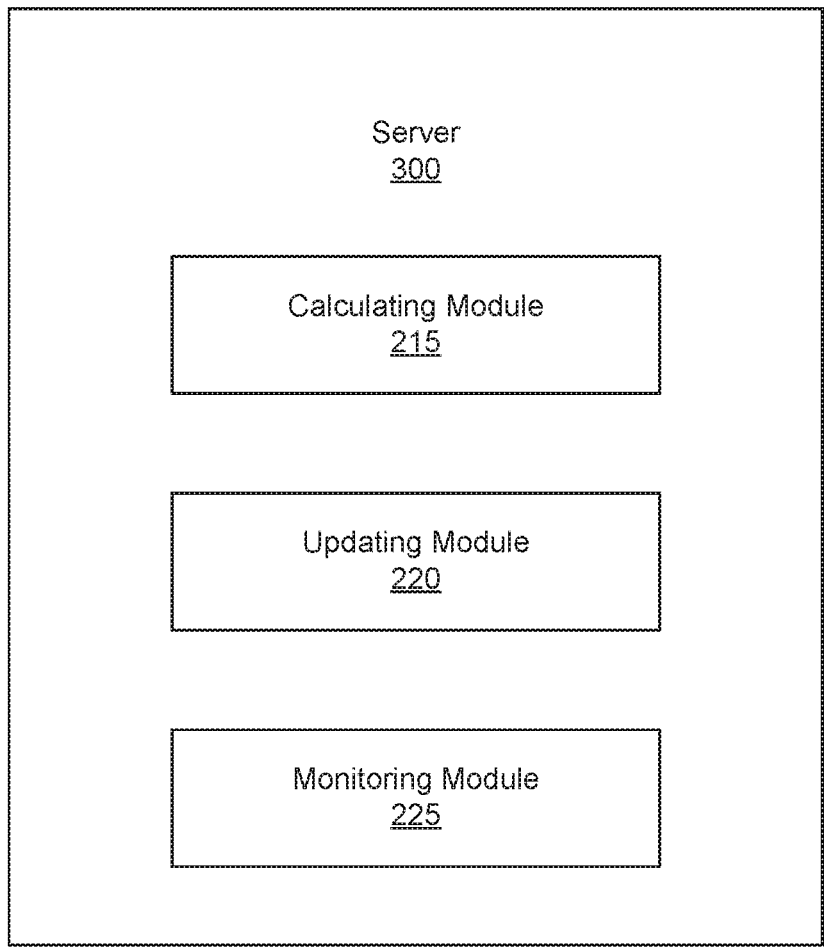
FIG. 3 is a block diagram of a server of a streaming network according to an example of the principles described herein.

FIG. 3 is a block diagram of a server (300) of a streaming network (200) according to an example of the principles described herein. In this example, the server (300) may include the calculating module (215), updating module (220), and the monitoring module (225) as described herein. The server (300) may function as a network-wide server used to monitor the entire streaming network (200). Each of the modules (215, 220, 225) may be operated by a processor of the server (300) and may direct the execution of the computer readable program code of the modules (215, 220, 225) described herein. In an example, the server (300) may further include a display device used to present to a user a number of graphical user interfaces that may present to a user at least, a topographical display of the nodes (205-1, 205-2) on the streaming network (200) and notice of delivery aspects of the packets as described herein.

In conclusion, the specification and figures describe a streaming network that simultaneously prevents packets from passing beyond a threshold number of hops from any given container while still assuring that the packets are delivered to the appropriate container. This prevents maliciously written or poorly written SABs from engaging in, for example, a denial of service process or any other type of nefarious processes not intended to be executed on the streaming network.

The preceding description has been presented to illustrate and describe examples of the principles described. This description is not intended to be exhaustive or to limit these principles to any precise form disclosed. Many modifications and variations are possible in light of the above teaching.

What is claimed is:
1. A computer-implemented method, comprising:
  calculating a time-to-live value for at least one packet based, at least in part, on a hop count between a plurality of processing element containers within an application streaming network;
  after calculating the time-to-live value, updating at least one processing element container output connection within the application streaming network based on the calculated time-to-live value;

monitoring a streams resource metrics service for a change in a packet delivery rate within the network responsive to the update; and, in response to a decrease in the packet delivery rate, changing the calculated time-to-live value until the packet delivery rate does not decrease.

2. The computer-implemented method of claim 1, further comprising performing a linear decrease in the changed time-to-live value until a minimum value is established and the packet delivery rate is steady.

3. The computer-implemented method of claim 1, wherein the time-to-live value is based on a number of hops plus a ceiling value.

4. The computer-implemented method of claim 1, wherein the time-to-live value is augmented by a maximum of either a first value or a second value multiplied by a constant.

5. The computer-implemented method of claim 4, wherein the constant is determined based on a scaling buffer.

6. The computer-implemented method of claim 1, wherein the hop count is determined based on a pinging process.

7. A streaming network, comprising:

a plurality of nodes having at least one processing element container within the streaming network, each container discarding packets that have exceeded a current time-to-live value;

a calculating module to calculate an updated time-to-live value for at least one packet based, at least in part, on a hop count of that packet among the plurality of processing element containers;

an updating module to update at least one processing element container output connection based on the updated time-to-live value; and a monitoring module to monitor a streams resource metrics service for a change in a packet delivery rate responsive to the updated time-to-live value;

wherein the updated time-to-live value is augmented by a maximum of either a first value or a second value multiplied by a constant.

8. The streaming network of claim 7, wherein, in response to a decrease in the packet delivery rate, the monitoring module changes the updated time-to-live value until the packet delivery rate does not decrease.

9. The streaming network of claim 8, wherein the monitoring module further performs a linear decrease in the changed time-to-live value until a minimum value is established and the packet delivery rate is steady.

10. The streaming network of claim 7, wherein the updated time-to-live value is constrained by a ceiling value.

11. The streaming network of claim 7, wherein the constant is determined based on a scaling buffer.

12. The streaming network of claim 7, wherein the plurality of processing element containers forms a stream computing application to be executed on the streaming network.

13. A computer program product for protecting a cloud environment the computer program product comprising a computer readable storage medium having program instructions embodied therewith, the program instructions executable by a processor to cause the processor to:

calculate a time-to-live value for at least one packet based, at least, on a hop count between each of a plurality of processing element containers within an application streaming network;

update at least one processing element container output connection based on the calculated time-to-live value, the updating to prevent packets passing from one processing element container to another not allocated to a stream application bundle (SAB) within a stream computing network; and monitor a streams resource metrics service for a change in a packet delivery rate.

14. The computer program product claim 13, further comprising, in response to a decrease in the packet delivery rate changing the calculated time-to-live value until the packet delivery rate does not decrease.

15. The computer program product of claim 14, further comprising performing a linear decrease in the increased time-to-live value until a minimum value is established and the packet delivery rate is steady.

16. The computer program product of claim 13, wherein the time-to-live value is based on a number of hops plus a ceiling value.

17. The computer program product of claim 13, wherein the time-to-live value has a maximum value of either a first value or a second value multiplied by a constant.

18. The computer program product of claim 17, wherein the constant is determined based on a scaling buffer.

* * * * *